June 15, 1965
P. ROSA ETAL
3,188,853
APPARATUS FOR DETERMINING THE TEMPERATURE
OF A COATING DURING CURING
Filed Feb. 1, 1963
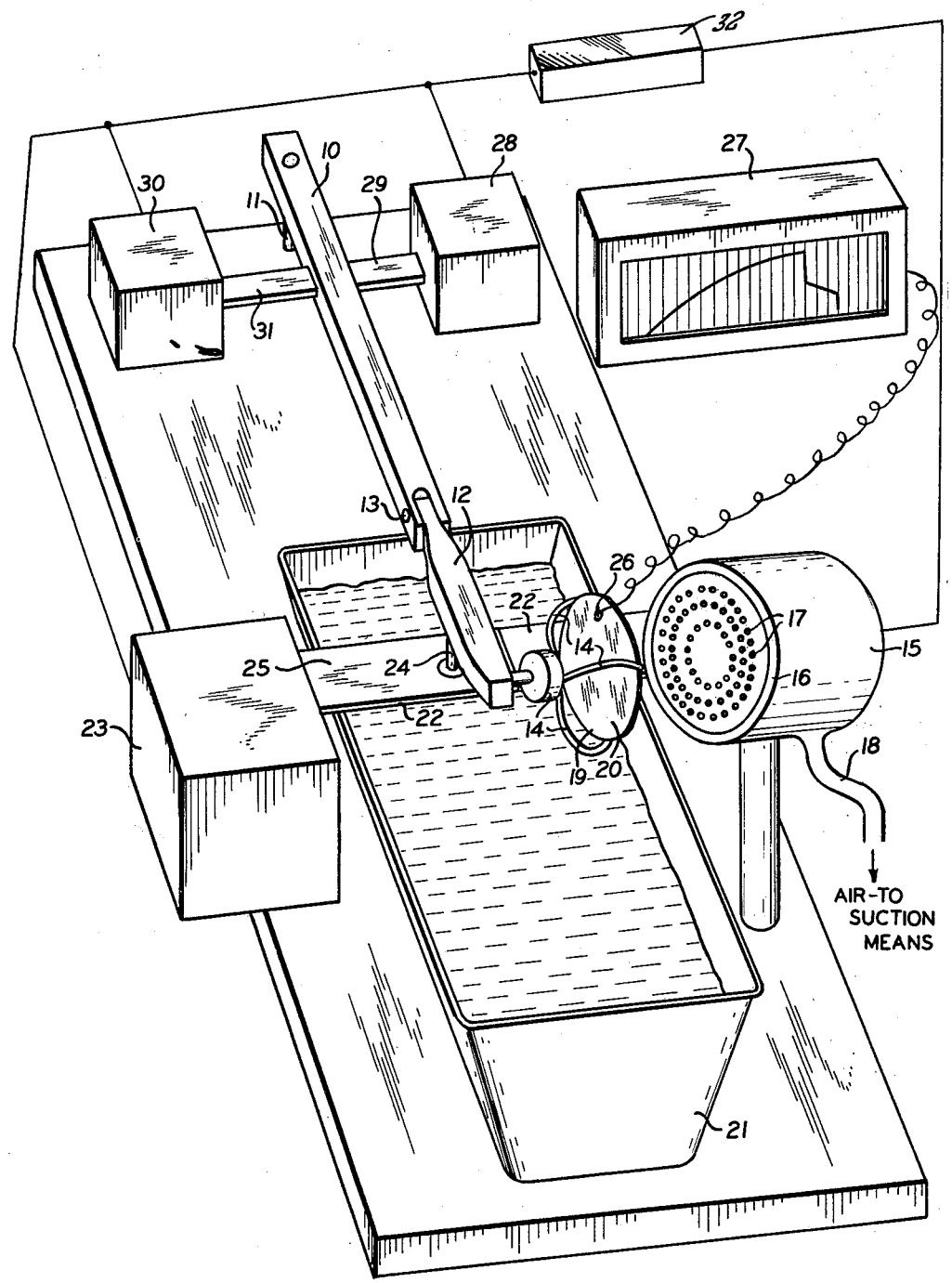

United States Patent Office 3,188,853
Patented June 15, 1965

3,188,853
APPARATUS FOR DETERMINING THE TEMPERATURE OF A COATING DURING CURING
Prisco Rosa, New York, N.Y., Edward C. Haskell, Cincinnati, Ohio, John A. Mascaro, Bronx, N.Y., and Alfred M. Tringali, Middlesex, N.J., assignors to Interchemical Corporation, New York, N.Y., a corporation of Ohio
Filed Feb. 1, 1963, Ser. No. 255,525
4 Claims. (Cl. 73—15)

This invention relates to an apparatus for recording the variation in temperature of coatings being cured over a short time period.

Conventional methods of curing coatings on metal surfaces involve curing times in the order of from 3 to 15 minutes at temperatures in the order of 350° to 500° F. When employing these conventional curing methods, the best specific temperatures and times for securing selected properties in particular coatings on metal substrates were determined by placing a series of samples of the selected coating on a selected substrate into laboratory scale ovens at selected oven temperatures and time periods. The temperature-time relationship which gave the most desirable results was then repeated in the large scale commercial ovens.

In recent years, there has arisen a demand for metal coatings which are faster curing, having curing times under a minute, e.g., in the order of 2 seconds to 1 minute. However, where the baking or curing was of such short duration, the proper temperature-time cycle can not be obtained with accuracy using the technique described above. An explanation of these inconsistencies may be that the temperature of the oven does not truly reflect the actual temperature as well as the variations in temperature of the coating being cured. While failure to take into account differences in time-temperature characteristics with respect to a given coating between the laboratory and commercial curing apparatus may not be significant where the curing cycle is relatively long, when the curing is very short such differences become very significant.

This invention provides an apparatus for determining the variation in temperature with respect to time of curing during the short time interval required to cure said coating.

Briefly stated, this apparatus comprises a source of heat and means for instantaneously bringing a plate coated with an uncured coating into heat transferring contact with said source of heat to cure the coating over a short time interval. These means include a pivotally mounted arm on which the plate is detachably mounted. One surface of the plate is coated with the uncured coating to be tested. A thermocouple is imbedded in the uncured coating and affixed to the plate. The plate is normally out of heat transferring relationship with the source of heat. Driving means are provided for rapidly pivoting said arm to instantaneously bring said plate into heat transferring relationship and instantaneously bring said plate out of heat transferring relationship with said source of heat. The instantaneous contact or heat transferring relationship between the plate and the heat source is very important in order to get the true time-temperature characteristics of the coating being cured. If the coated plate slowly approaches the heat source, some peripheral heat transfer will begin before the plate comes into full contact with said heat source. This will only confuse the time-temperature characteristics to be determined. Clearly the longer the period between this peripheral heat transfer and full contact, the more distorted will be the time-temperature characteristics desired. Therefore, by bringing the plate almost instantaneously into full contact with the source of heat, the period between peripheral heat transfer and full contact become so infinitesimally small as to be insignificant. The thermocouple may be connected to a suitable recording device to record the time-temperature characteristics as a cure. The apparatus of this invention also comprises a timing device which after a preselected time activates the driving means which pivots the arm to bring the plate out of heat transferring relationship with the heat source.

The apparatus may also include means for rapidly cooling the coating after removal from the source of heat, e.g., a quenching bath. The timing means may be set for activating the quenching immediately upon removal from the heat source or at any time thereafter.

This invention may be better understood by reference to the drawing which is a diagrammatic prospective view of a specific embodiment of the apparatus of this invention. Arm 10 is mounted on pin 11 so as to be pivotable in the horizontal plane. Arm extension 12 is mounted at the end of arm 10 so as to be pivotable in a vertical plane about pin 13. Plate holder 14 is mounted at the end of arm extension 12. Heat source 15 comprises housing 16, perforated hot plate 17 and means for heating said hot plate located within housing 16 such as an electric heating coil (not shown). Suction means (not shown) evacuate air from the chamber formed within housing 16 through conduit 18 so as to create vacuum pressure within housing 16 which will act through the perforations in hot plate 17 to retain a coated plate brought into contact with hot plate 17 flush against the hot plate. Coated plate 19 is detachably mounted within plate holder 14. Surface 20 of plate 19 is coated with the coating to be tested. Plate 19 is so positioned that when arm 10 is pivoted in a counter-clockwise direction, plate 19 is brought into flush contact with hot plate 17. Quenching bath 21 which contains a suitable quenching liquid, e.g., water at a selected temperature is positioned below plate 19. The gravitational force on arm extension 12 and plate 19 normally urges arm extension 12 and plate 19 to pivot downward into quenching bath 21. However, the arm extension and plate are prevented from pivoting and arm extension 12 is retained in alignment with arm 10 by bridge 22 which extends from housing 16 to housing 23 and supports leg 24 which in turn supports arm extension 12. Leg 24 rides along bridge 22 as arm 10 is pivoted to bring plate 20 into and out of contact with the hot plate. Bridge 22 has a segment 25 which is retractable, that is a solenoid (not shown) contained in housing 23 can act to retract bridge segment 25 to remove the support under arm extension 12, thus permitting plate 19 to drop into the quenching bath. Thermocouple 26 is imbedded in the coated surface of plate 19 and is connected to a suitable recording device 27. Arm 10 is pivoted counter-clockwise by a solenoid (not shown) in housing 28 which acts on arm 10 by means of bar 29, and arm 10 is pivoted clockwise by a solenoid (not shown) in housing 30 which acts on arm 10 by means of bar 31.

In a typical cycle of operation of the device described, a timing device 32 is programmed to energize and de-energize the solenoids contained in housing 23, 28, and 30 in the following sequence. At the beginning of the cycle, plate 19 having an uncured coating is mounted in plate holder 14 while arm 10 is so positioned that plate 19 is out of contact with with hot plate 17 and leg 24 is supported on bridge segment 25. At the selected starting point, the solenoid in housing 28 is energized causing bar 29 to rapidly pivot arm 10 so that plate 19 is brought instantaneously flush against hot plate 17. Simultaneously, the air suction means are activated causing the vacuum which holds plate 19 against hot plate 17. The coating cures and thermocouple 26 measures the temperature which is recorded in recording device 27 as a time-temperature curve. Then at a preselected time, the timing device 32 simultaneously stops the suction means, deenergizes the solenoid in housing 28, and energizes the solenoid in housing 30 which through bar 31 acts to pivot arm 10 clockwise bringing plate 19 out of contact with hot plate 17. If quench cooling is part of the cycle at this point or thereafter, the timing device energizes the solenoid in housing 23 which retracts bridge segment 25 removing the support for arm extension 12 which, urged by gravitational force pivots downward dropping plate 19 into the quenching bath 21. All during the cooling and quenching operations, thermocouple 25 and recording device 27 measure and record the temperature with respect to time.

While there have been described what is at present considered to be the preferred embodiments of this invention, it will be obvious to those skilled in the art that various changes and modifications may be made therein without departing from the invention. For example, the source of heat may be a direct flame with the coated surface facing away from the flame. The heat source may also be high velocity hot air, as well as radiant or induction heat. Therefore, we aim to cover all such changes and modifications as fall within the true spirit and scope of the invention.

What is claimed is:

1. Apparatus for determining the variation in temperature of a coating being cured over a short time interval comprising a source of heat, a pivotally mounted arm, a detachable plate mounted on said arm, one surface of said plate being coated with the uncured coating to be tested, a thermocouple attached to the coated surface of the plate and imbedded in said uncured coating, said plate being normally out of heat transferring relationship with said source of heat, driving means for rapidly pivoting said arm to bring said plate into instantaneous heat transferring relationship with said heat source to cure the coating on the plate and retracting means for pivoting said arm to bring said plate out of heat transferring relationship with said heat source, timing means for activating said retracting means at a preselected time interval after the activation of said driving means and temperature recording means connected to said thermocouple for recording the temperature of said coating during the period of contact with said heat source and thereafter.

2. Apparatus for determining the variation in temperature of a coating being cured over a short time interval comprising a source of heat comprising a heated plate and means for heating said plate, a pivotally mounted arm having mounted thereon a detachable plate, said detachable plate being coated with the uncured coating to be tested, a thermocouple attached to the coated surface of the detachable plate and imbedded in said uncured coating, said detachable plate being normally out of heat transferring relationship with said source of heat, solenoid activated driving means for rapidly pivoting said arm to bring the detachable plate into instantaneous heat transferring relationship with said source of heat, the uncoated side of said detachable plate being flush again said heated plate, solenoid activated retracting means for pivoting said arm to bring said detachable plate out of heat transferring contact with said heated plate, timing means for activating said retracting means at a preselected time interval after the activation of said driving means and temperature recording means connected to said thermocouple for recording the temperature of said coating during the period of contact between said detachable plate and said heated plate and thereafter.

3. The apparatus of claim 2, wherein said heat source comprises a housing completely enclosing a chamber, the heated plate forming one side of said housing, the means for heating said heated plate being enclosed within said housing and the heated plate having formed therein a plurality of apertures and further including means for evacuating air from said chamber whereby a vacuum is created which by means of the apertures in said heated plate acts to retain said detachable plate in flush contact with said heated plate, said air evacuating means being activated simultaneuosly with said driving means and said air evacuating means terminated by said timing means simultaneously with the activation of said retracting means.

4. The apparatus of claim 2 wherein said arm is laterally pivotable and said arm further comprises a vertically pivotable arm extension on which said detachable plate is mounted, said arm extension being normally urged to pivot downward by the force of gravity, and further including removable supporting means for said arm extension acting to prevent downward pivoting and to maintain said extension in alignment with said arm, a quenching bath positioned in the potential path of a downward pivot by said arm extension and means for removing said supporting means, said means for removing said supporting means being activatable by said timing means at a preselected time simultaneous with or subsequent to the activation of the retracting means for said pivotable arm whereby said supporting means are removed and said arm extension and detachable plate are pivoted downwardly by the force of gravity into said quenching bath.

References Cited by the Examiner

UNITED STATES PATENTS 2,717,515  9/55  Pesante _____ 73—15
3,098,725  7/63  Stuchbery et al. _____ 117—119.6

RICHARD C. QUEISSER, *Primary Examiner.*